US010550803B2

(12) United States Patent
Hamada et al.

(10) Patent No.: US 10,550,803 B2
(45) Date of Patent: Feb. 4, 2020

(54) FILTER MEDIUM FOR FILTER, METHOD FOR PRODUCING THE SAME, AND FILTER

(71) Applicants: Mahle Filter Systems Japan Corporation, Toshima-ku, Tokyo (JP); TEIJIN LIMITED, Osaka, Osaka (JP)

(72) Inventors: Yuichi Hamada, Toshima-ku (JP); Mitutosi Suzuki, Toshima-ku (JP); Hiroyuki Ishii, Toshima-ku (JP); Kenji Inagaki, Ibaraki (JP)

(73) Assignees: TEIJIN FRONTIER CO., LTD., Osaka (JP); Mahle Filter Systems Japan Corporation, Tokyo (JP)

( * ) Notice: Subject to any disclaimer, the term of this patent is extended or adjusted under 35 U.S.C. 154(b) by 324 days.

(21) Appl. No.: 14/362,727

(22) PCT Filed: Sep. 25, 2012

(86) PCT No.: PCT/JP2012/074503
§ 371 (c)(1),
(2) Date: Jun. 4, 2014

(87) PCT Pub. No.: WO2013/094268
PCT Pub. Date: Jun. 27, 2013

(65) Prior Publication Data
US 2014/0360145 A1 Dec. 11, 2014

(30) Foreign Application Priority Data
Dec. 19, 2011 (JP) ................. 2011-277014

(51) Int. Cl.
*B01D 46/00* (2006.01)
*F02M 35/024* (2006.01)
*B01D 39/16* (2006.01)
*B01D 39/18* (2006.01)
*D21H 27/08* (2006.01)
*D04H 1/4374* (2012.01)
*D21H 27/30* (2006.01)
*D04H 1/4382* (2012.01)

(52) U.S. Cl.
CPC ....... *F02M 35/02458* (2013.01); *B01D 39/16* (2013.01); *B01D 39/163* (2013.01); *B01D 39/18* (2013.01); *D04H 1/4374* (2013.01); *D04H 1/4382* (2013.01); *D21H 27/08* (2013.01); *D21H 27/30* (2013.01); *F02M 35/024* (2013.01); *B01D 2239/025* (2013.01); *B01D 2239/065* (2013.01); *B01D 2239/086* (2013.01); *B01D 2239/10* (2013.01); *B01D 2239/1233* (2013.01); *F02M 35/02408* (2013.01); *F02M 35/02441* (2013.01)

(58) Field of Classification Search
CPC ............ B01D 2275/10; B01D 39/1623; B01D 46/10; B01D 39/16; B01D 39/18; B01D 39/20; B01D 39/1607; B01D 39/163; B01D 2239/65; B01D 2239/654; B01D 2239/663; B01D 2239/025; B01D 2239/086; B01D 2239/10; B01D 2239/1225; B01D 2239/1233; F02M 35/02408; F02M 35/02458; D04H 1/4374
USPC ........ 55/330, 482, 486, 466, 490, 495, 512, 55/524; 95/273; 123/573; 162/123, 131, 162/145–146, 149, 153, 156; 422/1, 2, 422/50, 56, 421
See application file for complete search history.

(56) References Cited

U.S. PATENT DOCUMENTS

| 4,482,365 | A | 11/1984 | Roach | |
|---|---|---|---|---|
| 2004/0038014 | A1* | 2/2004 | Schaefer | B01D 39/1607 428/220 |
| 2005/0112320 | A1* | 5/2005 | Wright | B32B 5/18 428/95 |
| 2007/0044443 | A1* | 3/2007 | Nixdorf | B01D 39/18 55/523 |
| 2007/0131235 | A1* | 6/2007 | Janikowski | B01D 39/1623 131/332 |
| 2009/0269563 | A1 | 10/2009 | Naruse et al. | |
| 2010/0031940 | A1* | 2/2010 | Mosset et al. | 123/573 |
| 2010/0133173 | A1* | 6/2010 | Inagaki | B01D 39/1623 210/504 |
| 2010/0300295 | A1* | 12/2010 | Yamakawa | 96/12 |
| 2011/0030356 | A1* | 2/2011 | Yasuda | 60/299 |
| 2013/0248454 | A1* | 9/2013 | Frisk et al. | 210/702 |

FOREIGN PATENT DOCUMENTS

| JP | 58-197465 A | 11/1983 |
|---|---|---|
| JP | 8-243323 A | 9/1996 |
| JP | 9-170199 A | 6/1997 |
| JP | 2002-204913 A | 7/2002 |
| JP | 2004-301121 A | 10/2004 |
| JP | 3678511 B2 | 5/2005 |
| JP | 2006-289209 A | 10/2006 |
| JP | 2007-191849 A | 8/2007 |
| JP | 2009-197374 A | 9/2009 |
| JP | 2009197374 * | 9/2009 |
| JP | 2009-299222 A | 12/2009 |
| JP | 2007-170224 A | 7/2014 |

(Continued)

OTHER PUBLICATIONS

International Preliminary Report on Patentability for Application No. PCT/JP2012/074503, mail date of Jul. 3, 2014, 14 pages.

*Primary Examiner* — Jason M Greene
(74) *Attorney, Agent, or Firm* — Sughrue Mion, PLLC

(57) ABSTRACT

Provided are a filter medium for a filter, which makes it possible to obtain a filter high in collection efficiency, low in pressure loss and long in filter lifetime, a method for producing the same, and a filter using the filter medium for a filter. A filter medium for a filter is used as a constituent member of a filter and composed of a wet type nonwoven fabric, wherein the filter medium for a filter has a multilayer structure of two or more layers, and there is no interface between the above-mentioned two layers.

8 Claims, No Drawings

(56) References Cited

FOREIGN PATENT DOCUMENTS

| WO | 90/06388 A1 | 6/1990 |
| WO | 2005/095686 A1 | 10/2005 |
| WO | 2008/130019 A1 | 10/2008 |

* cited by examiner

FILTER MEDIUM FOR FILTER, METHOD FOR PRODUCING THE SAME, AND FILTER

CROSS REFERENCE TO RELATED APPLICATIONS

This application is a National Stage of International Application No. PCT/JP2012/074503 filed Sep. 25, 2012 (claiming priority based on Japanese Patent Application No. 2011-277014 filed Dec. 19, 2011), the contents of which are incorporated herein by reference in their entirety.

TECHNICAL FIELD

The present invention relates to a filter medium for a filter, which makes it possible to obtain a filter that is high in collection efficiency, low in pressure loss and long in filter lifetime, a method for producing the same, and a filter using the filter medium for a filter.

BACKGROUND ART

As filter media for filters, various ones have hitherto been proposed. For example, there have been proposed an airlaid multilayer filter medium having a fiber fineness gradient (for example, see Patent Document 1), one in which ultrafine fibers obtained by an electrospinning process are laminated on a surface layer of a general-purpose nonwoven fabric (for example, see Patent Document 2 and Patent Document 3), and the like.

Of these, the airlaid multilayer filter medium having a fiber fineness gradient make it possible to achieve low pressure loss and a high filter lifetime, but is insufficient for collecting extremely fine dusts. Further, the filter medium in which the ultrafine fibers are laminated on the surface layer of the general-purpose nonwoven fabric comes into a state where the surface layer is planarly coated with the ultrafine fibers, so that there has been a problem of an easy increase in pressure loss, easy omission of the fibers because of their insufficient adhesiveness with the nonwoven fabric as a substrate, or the like.

A nonwoven fabric composed of short-cut nanofibers has also been proposed. However, although this nonwoven fabric has been designed to place emphasis on achievement of initial efficiency, the fabric has not been considered to be sufficient yet in terms of the filter lifetime (for example, see Patent Document 4).

PRIOR-ART DOCUMENTS

Patent Documents

[Patent Document 1] JP-A-2004-301121
[Patent Document 2] JP-A-2006-289209
[Patent Document 3] JP-A-2007-170224
[Patent Document 4] Pamphlet of International Publication No. 2008/130019

OUTLINE OF THE INVENTION

Problems that the Invention is to Solve

The present invention has been made in view of the above-mentioned background, and an object thereof is to provide a filter medium for a filter, which makes it possible to obtain a filter that is high in collection efficiency, low in pressure loss and long in filter lifetime, a method for producing the same, and a filter using the filter medium for a filter.

Means for Solving the Problems

In order to solve the above-mentioned problems, the present inventors have made intensive studies. As a result, it has been found that in a filter medium for a filter, which is composed of a wet type nonwoven fabric and has a multilayer structure of two or more layers in a thickness direction, a balance of pressure loss, collection efficiency and lifetime can be obtained by gradually varying a layer constitution from one layer to the other layer without allowing an interface to be present between two adjacent layers of the above-mentioned multilayer structure. The inventors have made further intensive studies, thereby leading to completion of the present invention.

Thus, according to the present invention, there is provided "a filter medium for a filter, which is used as a constituent member of a filter and composed of a wet type nonwoven fabric, characterized in that the filter medium for a filter has a multilayer structure of two or more layers and in that there is no interface between two adjacent layers of the above-mentioned multilayer structure".

In that case, the filter medium for a filter preferably contains short-cut nanofibers composed of a fiber-forming thermoplastic polymer, having a single fiber diameter (D) of 100 to 1,000 nm and obtained by performing cutting so that the ratio (L/D) of the length (L) to the single fiber diameter (D) is within the range of 100 to 2,500.

In that case, the above-mentioned short-cut nanofibers are preferably ones obtained by dissolving and removing a sea component from a conjugate fiber comprising an island component composed of a fiber-forming thermoplastic polymer and having an island diameter (D) of 100 to 1,000 nm and the sea component composed of a polymer more easily soluble in an alkaline aqueous solution than the above-mentioned fiber-forming thermoplastic polymer.

Further, in the above-mentioned conjugate fiber, the sea component is preferably polyethylene terephthalate copolymerized with 6 to 12% by mole of 5-sodium sulfoisophthalic acid and 3 to 10% by weight of polyethylene glycol having a molecular weight of 4,000 to 12,000.

Furthermore, in the above-mentioned conjugate fiber, the island component is preferably a polyester.

In addition, in the above-mentioned conjugate fiber, the number of islands is preferably 100 or more.

In the filter medium for a filter of the present invention, it is preferred that core-sheath conjugate type binder fibers are further contained.

Further, when the delamination strength between the two adjacent layers of the above-mentioned multilayer structure is measured 10 times (hereinafter referred to as "with n number being 10, i.e., with n=10," for the remaining 8 values except for the maximum value and the minimum value thereof, the ratio of the maximum value/the minimum value is preferably 1.5 or more.

Furthermore, in both surfaces of the filter medium for a filter, when the number of fibers on a surface on which more fibers are exposed is taken as DL and the number of fibers on the other surface on which fewer fibers are exposed is taken as DU, the DU/DL ratio is preferably 0.8 or less.

In addition, the basis weight thereof is preferably within the range of 30 to 300 g/m².

Further, the thickness thereof is preferably within the range of 0.5 to 4.0 mm.

Then, according to the present invention, there is provided a method for producing the above-mentioned filter medium for a filter comprising (1) performing papermaking using a slurry for a first layer, (2) additionally putting a slurry for a second layer therein until the papermaking process is completed, and (3) further repeating the same operation as in the above-mentioned process of (2) also in a subsequent process as needed.

Further, according to the present invention, there is provided a filter using the above-mentioned filter medium for a filter.

In that case, such a filter is preferably an air filter for an internal combustion engine.

Advantageous Effects of the Invention

According to the present invention, there are obtained a filter medium for a filter, which makes it possible to obtain a filter that is high in collection efficiency, low in pressure loss and long in filter lifetime, a method for producing the same, and a filter using the filter medium for a filter.

Mode for Carrying Out the Invention

A mode for carrying out the invention will be described in detail below.

The filter medium for a filter of the present invention is a filter medium for a filter, which is used as a constituent member of a filter and composed of a wet type nonwoven fabric, and is characterized in that the filter medium for a filter has a multilayer structure of two or more layers (preferably two layers) (namely, is a wet type nonwoven fabric obtained by using two or more slurries) and in that there is no interface between two adjacent layers of the above-mentioned multilayer structure.

"There is no interface" as used herein means that a layer composition gradually varies from one layer to the other layer. When there is an interface, that is to say, when the respective layers are separately formed by papermaking and thereafter laminated, the density of the respective layers increases, which might increase pressure loss. This is therefore unfavorable.

In the present invention, when the following short-cut nanofibers are contained, high collection efficiency is obtained. This is therefore preferred.

<Short-Cut Nanofibers>

It is preferred that the short-cut nanofibers are composed of a fiber-forming thermoplastic polymer, have a fiber diameter (D) of 100 to 1,000 nm, preferably 300 to 800 nm and particularly preferably 550 to 800 nm, and are obtained by performing cutting so that the ratio (L/D) of the fiber length (L) to the fiber diameter (D) is within the range of 100 to 2,500, preferably 300 to 1,500 and particularly preferably 500 to 1,000. When the above-mentioned fiber diameter (D) is more than 1,000 nm, the pore diameter of pores that appear on a surface of the wet type nonwoven fabric might become uneven (that is to say, the ratio of the average pore size and the maximum pore size increases). On the other hand, when the above-mentioned fiber diameter (D) is less than 100 nm, the fibers might become liable to drop out of a net at the time of papermaking. Further, when the above-mentioned radio (L/D) is more than 2,500, entanglement of the fibers occurs at the time of papermaking to cause poor dispersion. Accordingly, the pore diameter of pores that appear on the surface of the wet type nonwoven fabric might become uneven (that is to say, the ratio of the average pore size and the maximum pore size increases). On the other hand, when the above-mentioned ratio (L/D) is less than 100, linkage between the fibers is extremely weakened, and in a papermaking process, transfer thereof from a wire part to a blanket becomes difficult, possibly resulting in a deterioration of process stability.

Although a method for producing the nanofibers (sometimes also referred to as "ultrafine fibers" in the present invention) as described above is not particularly limited, a method disclosed in a pamphlet of International Publication No. 2005/095686 is preferred. That is to say, in terms of the fiber diameter and its uniformity, preferred are ones obtained by cutting a sea-island type conjugate fiber (sometimes also referred to as a "conjugate fiber" in the present invention) comprising an island component composed of a fiber-forming thermoplastic polymer and having an island diameter (D) of 100 to 1,000 nm and a sea component composed of a polymer (hereinafter sometimes also referred to as an "easily soluble polymer") that is more easily soluble in an alkaline aqueous solution than the above-mentioned fiber-forming thermoplastic polymer, followed by performing alkali reduction processing, thereby dissolving and removing the above-mentioned sea component. Incidentally, the above-mentioned island diameter can be measured by taking a photograph of a cross-section of the fiber using a transmission type electron microscope. In addition, when the island has a noncircular cross-section shape other than a circular cross-section shape, the diameter of a circumscribed circle thereof is used as the above-mentioned island diameter (D).

Here, when the dissolution rate ratio of the polymer that is easily soluble in an alkaline aqueous solution and forms the sea component to the fiber-forming thermoplastic polymer that forms the island component is 200 or more and preferably from 300 to 3,000, island separability is improved. This is therefore preferred. When the dissolution rate ratio is less than 200 times, the separated island component in a surface layer portion of a fiber cross-section is dissolved because of the small fiber diameter, while the sea component in the center portion of the fiber cross-section is dissolved. Accordingly, the sea component in the center portion of the fiber cross-section cannot be completely dissolved and removed, although the sea-corresponding weight is reduced, which leads to thickness unevenness of the island component or solvent erosion of the island component itself. Thus, the nanofibers having a uniform fiber diameter might not be able to be obtained.

Preferred examples of the easily soluble polymers that form the sea component include polyesters, aliphatic polyamides and polyolefins such as polyethylene and polystyrene, which have particularly good fiber-forming properties. Further specific examples of the polymers easily soluble in an alkaline aqueous solution optimally include polyester-based polymers such as polylactic acid, ultrahigh molecular weight polyalkylene oxide condensation polymers and copolymerized polyesters of polyalkylene glycol-based compounds and 5-sodium sulfoisophthalic acid.

The alkaline aqueous solution as used herein means an aqueous solution of an alkali metal salt such as potassium hydroxide or sodium hydroxide. In addition to this, examples of solvents capable of resolving the easily soluble polymers to form the sea component include formic acid to aliphatic polyamides such as nylon 6 and nylon 66, trichloroethylene to polystyrene, hydrocarbon-based solvents such as hot toluene and xylene to polyethylene (particularly, high-pressure low-density polyethylene or linear low-density polyethylene) and hot water to polyvinyl alcohol or ethylene-modified vinyl alcohol-based polymers.

Of the polyester-based polymers, preferred is a polyethylene terephthalate-based copolymerized polyester having an intrinsic viscosity (determined from a value obtained by measuring a viscosity of a diluted solution in which a polyester composition is dissolved in orthochlorophenol at 100° C. for 60 minutes, using an Ubbelohde viscometer at 25° C.) of 0.4 to 0.6, which is copolymerized with 6 to 12% by mole of 5-sodium sulfoisophthalic acid and 3 to 10% by weight of polyethylene glycol having amolecular weight of 4,000 to 12,000. Here, 5-sodium sulfoisophthalic acid contributes to hydrophilicity and improvement in melt viscosity, and polyethylene glycol (PEG) improves hydrophilicity. Further, PEG having a higher molecular weight has a more hydrophilicity-increasing action that is considered to be caused by its higher-order structure. However, reactivity thereof is deteriorated to forma blend system, so that problems might be raised with regard to heat resistance and spinning stability. Furthermore, when the copolymerized amount of PEG exceeds 10% by weight, it causes a melt viscosity-decreasing action. This is therefore unfavorable.

On the other hand, suitable examples of the slightly soluble polymers forming the island component include polyamides, polyesters, polyolefins and the like. In particular, the polyesters are preferred. Specifically, in use requiring mechanical strength or heat resistance, preferred as the polyesters are polyethylene terephthalate (hereinafter sometimes also referred to as "PET"), polytrimethylene terephthalate, polybutylene terephthalate, polyethylene naphthalate and copolymers having these as main repeating units, which are copolymerized with aromatic dicarboxylic acids, aliphatic dicarboxylic acids such as adipic acid and sebacic acid, hydroxycarboxylic acid condensates such as ε-caprolactone, glycol components such as diethylene glycol, trimethylene glycol, tetramethylene glycol and hexamethylene glycol, or the like. Further, as the polyamides, preferred are aliphatic polyamides such as nylon 6 and nylon 66. On the other hand, the polyolefins are characterized by that they are hard to be attacked by acids or alkalis, that they can be used as a binder component after being taken out as the ultrafine fibers because of their relatively low melting point, and the like. Preferred examples thereof include high-density polyethylene, medium-density polyethylene, high-pressure low-density polyethylene, linear low-density polyethylene, isotactic polypropylene, ethylene-propylene copolymers, ethylene copolymers of vinyl monomers such as maleic anhydride, and the like.

Further, the island component may have not only a circular cross-section, but also a noncircular cross-section. In particular, aromatic polyesters such as polyethylene terephthalate, polytrimethylene terephthalate, polybutylene terephthalate, polyethylene terephthalate isophthalate having an isophthalic acid copolymerization ratio of 20% by mole or less and polyethylene naphthalate or aliphatic polyamides such as nylon 6 and nylon 66 can be preferably applied to use requiring heat resistance and strength, compared to ultrafine fibrillated fibers obtained from polyvinyl alcohol/polyacrylonitrile blend spinning fibers, because they have heat resistance due to their high melting point and mechanical characteristics.

Incidentally, the polymers forming the sea component and the polymers forming the island component may contain various additives such as organic fillers, antioxidants, heat stabilizers, light stabilizers, flame retardants, lubricants, antistatic agents, corrosion inhibitors, crosslinking agents, foaming agents, fluorescent agents, surface smoothing agents, surface gloss improvers and release improvers such as fluororesins, as needed, within the range not exerting influence on fiber-forming properties and physical properties of the ultrafine fibers after extraction.

In the above-mentioned sea-island type conjugate fiber, it is preferred that the melt viscosity of the sea component at the time of melt spinning is higher than the melt viscosity of the island component polymer. In the case where such a relationship is satisfied, even when the conjugate weight ratio of the sea component becomes as low as less than 40%, islands are less likely to stick together, or almost all of the islands are less likely to stick, resulting in easy formation of the sea-island type conjugate fiber.

The preferred melt viscosity ratio (sea/island) is within the range of 1.1 to 2.0, particularly 1.1 to 1.5. When this ratio is less than 1.1, the islands become liable to stick together at the time of melt spinning. On the other hand, in the case of exceeding 2.0, the spinning behavior tends to be deteriorated, because the difference in viscosity is too large.

Then, in the above-mentioned sea-island type conjugate fiber, the number of islands is preferably 100 or more (more preferably, from 300 to 1,000). Further, the sea-island conjugate weight ratio (sea:island) thereof is preferably within the range of 5:95 to 95:5. Within such a range, the thickness of the sea component between the islands can be decreased to make it easy to dissolve and remove the sea component, resulting in easy conversion of the islands to the nanofibers. This is therefore preferred. Here, when the ratio of the sea component exceeds 95%, the thickness of the sea component becomes too thick. On the other hand, in the case of less than 5%, the amount of the sea component becomes too small, resulting in easy occurrence of sticking between the islands.

As a spinneret used for melt spinning, there can be used any one having a hollow pin group or a fine orifice group for forming the island components. For example, there may be used a spinning spinneret in which the island components extruded from the hollow pins or the fine orifices and a sea component flow extruded from a flow passage that is designed in such a form as to fill a gap therebetween are allowed to meet together, followed by compression thereof, thereby forming a sea-island cross-section. The sea-island type conjugate fiber extruded is solidified by a cooling air and taken up by a rotary roller or ejector that is set to a predetermined take-up speed to obtain an undrawn yarn. Although not particularly limited, this take-up speed is desirably from 200 to 5,000 m/min. Less than 200 m/min results in poor productivity, whereas exceeding 5,000 m/min results in poor spinning stability.

The undrawn yarn obtained may be subjected to a cut process or a subsequent extraction process as such depending on use and purpose of the ultrafine fibers obtained after extraction of the sea component, or in order to match intended strength, elongation and thermal shrinkage characteristics, can be subjected to the cut process or the subsequent extraction process through a drawing process or a heat treatment process. The drawing process may be a separate draw system in which spinning and drawing are performed in separate steps or a direct draw system in which drawing is performed immediately after spinning in one step.

Then, such a conjugate fiber is cut so that the ratio (L/D) of the length (L) to the single fiber diameter (D) is within the range of 100 to 2,500. Such cutting is preferably performed by cutting the undrawn or drawn yarn as such or a tow bundled by tens to millions of yarns, with a guillotine cutter, a rotary cutter or the like. Further, cutting may be performed in a process after the following extraction process (alkali reduction processing).

In the above-mentioned extraction process (alkali reduction processing), the ratio (bath ratio) of the fibers and the alkaline solution is preferably from 0.1 to 5%, and more preferably from 0.4 to 3%. When it is less than 0.1%, process properties such as water discharge might become difficult, although the fibers much come into contact with the alkaline solution. On the other hand, when it exceeds 5%, entanglement of the fibers might occur at the time of the alkali reduction processing, because the fiber amount is too large. Incidentally, the bath ratio is defined by the following equation:

$$\text{Bath ratio (\%)} = [\text{fiber weight (gr)/alkaline aqueous solution weight (gr)}] \times 100$$

Further, the processing time of the alkali reduction processing is preferably from 5 to 60 minutes, and more preferably from 10 to 30 minutes. When it is less than 5 minutes, the alkali reduction processing might become insufficient. On the other hand, when it exceeds 60 minutes, the island component might also be reduced in weight.

Incidentally, the processing temperature at the time of the alkali reduction processing is usually from 50 to 90° C., and preferably from about 60 to 80° C.

Further, alkalis used for the alkali reduction processing include sodium hydroxide and the like.

Furthermore, in the alkali reduction processing, the alkali concentration is preferably from 2 to 10%. When it is less than 2%, the alkali is deficient, and the rate of alkali reduction might be extremely reduced. On the other hand, when it exceeds 10%, the alkali reduction excessively proceeds, and the island component might also be reduced in weight.

Methods for the alkali reduction include a method of putting a conjugate fiber cut (or not cut) in an alkaline solution, treating it under predetermined conditions for a predetermined period of time, thereafter, putting it in water again, once through a dehydration process, allowing neutralization and dilution to proceed using an organic acid such as acetic acid or oxalic acid, and finally performing dehydration, or a method of previously performing the neutralization treatment after the treatment for a predetermined period of time, further pouring water to allow the dilution to proceed, and thereafter performing the dehydration. In the former, production (processing) in small quantities can be performed because of batch type treatment. On the other hand, the neutralization treatment requires time, so that productivity is somewhat low. In the latter, semicontinuous production is possible, but there are disadvantages that the acid aqueous solution is required in large amounts at the time of the neutralization treatment and that water is required in large amounts for the dilution.

A treatment equipment is not limited in any way. However, from the viewpoint of preventing fiber dropout at the time of the dehydration, a mesh-like material (for example, an alkali non-hydrolyzable bag or the like) having an aperture ratio (which means the area of opening portions per unit area) of 10 to 50% as disclosed in Japanese Patent No. 3678511 is preferably applied. When the above-mentioned aperture ratio is less than 10%, the passing through of water is extremely slow. On the other hand, when it exceeds 50%, fiber dropout might occur.

Further, in order to increase dispersibility, after the alkali reduction processing, a dispersing agent (for example, type YM-81 manufactured by Takamatsu Oil & Fat Co., Ltd.) is preferably allowed to adhere onto fiber surfaces in an amount of 0.1 to 5.0% by weight based on the fiber weight.

The above-mentioned sea-island type conjugate fiber is converted to nanofibers composed of the above-mentioned island component by performing such alkali reduction processing to the above-mentioned sea-island type conjugate fiber. In that case, when the island component is composed of a polyester, the nanofibers are polyester fibers.

In the filter medium for a filter of the present invention, the ratio of the short-cut nanofibers to the total weight of the filter medium is from 0.5 to 20% by weight, preferably from 2 to 20% by weight, and more preferably from 3 to 10% by weight. When it is less than 0.5% by weight, not only satisfactory collection efficiency cannot be obtained, but also texture unevenness as the wet type nonwoven fabric might occur. This is therefore unfavorable. On the other hand, when it exceeds 20% by weight, the filter medium for a filter (wet type nonwoven fabric) becomes too dense, so that water filtering properties in a papermaking process is extremely deteriorated to cause a reduction in productivity or an excessive increase in pressure loss. This is therefore unfavorable.

<Core-Sheath Conjugate Type Binder Fibers>

When core-sheath conjugate type binder fibers are contained in addition to the above-mentioned short-cut nanofibers in the filter medium for a filter of the present invention, the structure of the filter medium is maintained. This is therefore preferred.

Such core-sheath conjugate type binder fibers are preferably core-sheath conjugate type binder fibers having a single fiber diameter of 5 μm or more, preferably 5 to 20 μm and more preferably 7 to 15 μm. Here, when the single fiber diameter of the core-sheath conjugate type binder fibers is less than 5 μm, rigidity of the fibers themselves is decreased, which might make it difficult to maintain the structure of the filter medium for a filter. On the other hand, when it exceeds 20 μm, the number of constituent binder fibers in the filter medium for a filter is decreased to decrease their adhesion points, which might cause a decrease in rigidity.

Further, the core-sheath conjugate type binder fibers are preferably cut to a fiber length of 3 to 100 mm.

Furthermore, the core-sheath conjugate type binder fibers are contained in the filter medium for a filter of the present invention in an amount of 60% by weight or less, preferably 20 to 40% by weight.

As such core-sheath conjugate type binder fibers, it is preferred that a polymer having a melting point at least 40° C. lower than that of the polymer that forms the above-mentioned short-cut nanofibers is arranged on surfaces thereof as a thermal adhesive component.

The polymers arranged as the thermal adhesive component herein include polyurethane-based elastomers, polyester-based elastomers, non-elastic polyester-based polymers and copolymers thereof, polyolefin-based polymers and copolymers thereof, polyvinyl alcohol-based polymers and the like.

Of these, the polyurethane-based elastomers are polymers obtained by reaction of low-melting polyols having a molecular weight of about 500 to 6,000, for example, dihydroxypolyethers, dihydroxy polyesters, dihydroxy polycarbonates, dihydroxy polyesteramides and the like, organic diisocyanates having a molecular weight of 500 or less, for example, p,p'-diphenylmethane diisocyanate, tolylene diisocyanate, isophorone diisocyanate, hydrogenated diphenylmethane diisocyanate, xylylene diisocyanate, 2,6-diisocyanate methyl caproate, hexamethylene diisocyanate and the like, and chain extenders having a molecular weight of 500 or less, for example, glycols, aminoalcohols or triols.

Of these polymers, particularly preferred is a polyurethane using polytetramethylene glycol as the polyol, or poly-ε-caprolactone or polybutylene adipate.

Further, the polyester-based elastomers include polyetherester copolymers obtained by copolymerizing thermoplastic polyesters as hard segments and poly(alkylene oxide) glycols as soft segments, more specifically, terpolymers composed of at least one dicarboxylic acid selected from alicyclic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid and 1,4-cyclohexanedicarboxylic acid, aliphatic dicarboxylic acids such as succinic acid, oxalic acid, adipic acid, sebacic acid, dodecanedioic acid and dimer acid, ester-forming derivatives thereof or the like; at least one diol component selected from aliphatic diols such as 1,4-butanediol, ethylene glycol, trimethylene glycol, tetramethylene glycol, pentamethylene glycol, hexamethylene glycol, neopentyl glycol and decamethylene glycol, alicyclic diols such as 1,1-cyclohexanedimethanol, 1,4-cyclohexanedimethanol and tricyclodecanedimethanol, ester-forming derivatives thereof or the like; and at least one of poly(alkylene oxide) glycols having an average molecular weight of about 400 to 5,000, such as polyethylene glycol, poly(1,2- and 1,3-propylene oxide) glycol, poly(tetramethylene oxide) glycol, a copolymer of ethylene oxide and propylene oxide and a copolymer of ethylene oxide and tetrahydrofuran.

In particular, in view of adhesiveness, thermal characteristics and strength, preferred is a block copolymerized polyetherester obtained by using poly-butylene-based terephthalate as a hard segment and poly-oxybutylene glycol as a soft segment. In this case, the polyester portion constituting the hard segment is a polybutylene terephthalate in which a main acid component is terephthalic acid, and a main diol component is a butylene glycol component. Of course, part of the acid component (usually, 30% by mole or less) may be replaced with another dicarboxylic acid component or another oxycarboxylic acid component. Similarly, part of the glycol component (usually, 30% by mole or less) may be replaced with a dioxy component other than the butylene glycol component. Further, the polyether portion constituting the soft segment may also be a polyether replaced with a dioxy component other than butylene glycol.

The copolymerized polyester-based polymers include copolymerized esters containing aliphatic dicarboxylic acids such as adipic acid and sebacic acid, aromatic dicarboxylic acids such as phthalic acid, isophthalic acid and naphthalene-dicarboxylic acid and/or alicyclic dicarboxylic acids such as hexahydroterephthalic acid and hexahydroisophthalic acid, and aliphatic or alicyclic diols such as diethylene glycol, polyethylene glycol, propylene glycol and paraxylene glycol, in the predetermined numbers, to which oxy acids such as parahydroxybenzoic acid are added as needed. For example, there can be used a polyester in which isophthalic acid and 1,6-hexandiol are added to and copolymerized with terephthalic acid and ethylene glycol.

Further, the polyolefin-based polymers include, for example, low-density polyethylene, high-density polyethylene, polypropylene, further, modified products thereof, and the like.

In particular, as the core-sheath conjugate type binder fibers, it is more preferred that a polyester is arranged as a core and that a low-melting polyester is arranged as a sheath, from the viewpoints of adhesiveness to the short-cut nanofibers and process properties (such as dispersibility) in the papermaking process.

Incidentally, various stabilizers, UV-absorbers, thickening branching agents, delusterants, colorants and other various improvers may be blended in the above-mentioned polymers as needed.

In the core-sheath conjugate type binder fibers, it is more preferred that the polyester is arranged as the core and that the low-melting polyester is arranged as the sheath, from the viewpoints of adhesiveness to the short-cut nanofibers and processing properties (such as dispersibility) in the papermaking process, as described above. Here, the thermal adhesive component preferably occupies at least a half of the surface area. The weight ratio of the thermal adhesive component and the other side component is suitably within the range of 10/90 to 70/30 in the conjugate ratio (weight ratio). The morphology of the core-sheath conjugate type binder fibers is a core-sheath type. In this core-sheath type core-sheath conjugate type binder fiber, the thermal adhesive component forms the sheath portion, and the other side component forms the core portion. This core portion may be arranged either concentrically or eccentrically.

<Other Fibers>

In the filter medium for a filter of the present invention, various synthetic fibers (polyethylene terephthalate, polytrimethylene terephthalate, nylon, olefinic series and aramid series), natural pulp such as wood pulp or linter pulp, synthetic pulp mainly composed of aramid or polyethylene and the like can be used as the other fibers other than the above-mentioned short-cut nanofibers and binder fibers. In particular, drawn polyethylene terephthalate short fibers composed of polyethylene terephthalate and having a single fiber diameter of 2 to 30 μm and a fiber length of 3 to 10 mm are preferred from the viewpoint of dimensional stability and the like.

The ratio of the above-mentioned other fibers is preferably 80% by weight or less, and more preferably about 60 to 80% by weight, in the filter medium for a filter.

<Constitution of Filter Medium for Filter>

In the filter medium for a filter of the present invention, it is preferred that the filter medium has a two-layer structure. In that case, the above-mentioned short-cut nanofibers are preferably contained only in one layer of the two layers. In this case, usually, the layer in which the above-mentioned short-cut nanofibers are contained forms a high-density layer, and the other layer forms a low-density layer. By providing such a density difference, it becomes more possible to obtain the filter having high collection efficiency and low pressure loss and having a long filter lifetime. This is therefore preferred.

Further, when the multilayer filter medium for a filter of the present invention is used as a filter, the high-density layer in which the above-mentioned short-cut nanofibers are contained is preferably disposed on a fluid outflow side (clean side). When the layer in which the above-mentioned short-cut nanofibers are contained is disposed on the fluid outflow side (clean side), it plays a role in collecting fine dusts.

In the filter medium for a filter of the present invention, the basis weight is preferably from 30 to 300 $g/m^2$, more preferably from 50 to 250 $g/m^2$, and particularly preferably from 80 to 200 $g/m^2$. Further, the thickness is preferably from 0.5 to 2.0 mm. Furthermore, the density is preferably from 0.05 to 0.3 $g/cm^3$.

Incidentally, in the filter medium for a filter of the present invention, when the multilayer structure is two layers, the basis weight of the high-density layer in which the short-cut nanofibers are contained is preferably from 10 to 140 $g/m^2$, more preferably from 20 to 120 $g/m^2$, and particularly preferably from 30 to 80 $g/m^2$, and the thickness thereof is from 0.2 to 1.8 mm. On the other hand, the basis weight of the low-density layer in which no short-cut nanofibers are contained is preferably from 20 to 160 g/m², more preferably from 30 to 130 g/m², and particularly preferably from 50 to 80 g/m², and the thickness thereof is from 0.3 to 2.2 mm.

Further, in the filter medium for a filter of the present invention, when the multilayer structure is two layers, for the basis weight ratio in the two layers, the basis weight ratio of the high-density layer in which the short-cut nanofibers are contained is from 10 to 60% by weight and preferably from 20 to 40% by weight, and the basis weight ratio of the low-density layer in which no short-cut nanofibers are contained is from 40 to 90% by weight and preferably from 60 to 80% by weight (with the proviso that the high-density layer+the low-density layer=100% by weight).

<Method for Producing Filter Medium for Filter>

Then, as a method for producing the filter medium for a filter of the present invention, preferred is a production method in which papermaking is performed to a multilayer structure to obtain a wet type nonwoven fabric by (1) performing papermaking using a slurry for a first layer, (2) additionally putting a slurry for a second layer therein until the papermaking process is completed, (3) further additionally putting a slurry for a third layer therein until the papermaking process of the second layer is completed, and further repeating the same operation as needed, with an ordinary fourdrinier machine, short net papermaking machine or cylinder paper machine, or as multiplayer papermaking combining a plurality of these machines, followed by heat treatment.

Here, "(1) performing papermaking using a slurry for a first layer, (2) additionally putting a slurry for a second layer therein until the papermaking process is completed" means that the slurry in the process of (2) is additionally put at the time when approximately 40% or more, preferably 50 to 70% of water in the slurry subjected to the papermaking in the papermaking process of (1) is withdrawn in the papermaking machine. In the subsequent process of (3) and following processes, the slurry of the next process may be similarly put.

In that case, as the heat treatment process, either a Yankee dryer or an air-through dryer may be used after the papermaking process. Further, it is also preferred to perform calendaring or embossing as needed.

The heat treatment temperature is usually from 100 to 140° C., and preferably from 110 to 130° C. The heat treatment time is usually from 30 to 300 seconds, and preferably from 60 to 180 seconds.

Thus, in this heat treatment process, the fibers constituting the filter medium are fixed to one another with the core-sheath conjugate type binder fibers contained in the filter medium.

In the thus-obtained filter medium for a filter, the filter medium for a filter has the multilayer structure of two or more layers, and there is no interface between two adjacent layers of the above-mentioned multilayer structure. In that case, as an indication for measuring the absence of the interface, when the delamination strength between the two adjacent layers of the above-mentioned multilayer structure is measured with n=10, for the remaining 8 values except for the maximum value and the minimum value thereof, the ratio of the maximum value/the minimum value is preferably 1.5 or more (more preferably from 1.5 to 2.5).

Like this, by the absence of the interface between the layers, it becomes possible to obtain the filter having high collection efficiency and low pressure loss and having a long filter lifetime. The present inventors presume that the reason for this is that when the respective layers are laminated after papermaking has been separately performed, the lower basis weight tends to cause the higher density by papermaking, so that the pressure loss of the wet type nonwoven fabric (filter medium) after lamination increases, whereas when papermaking is performed by putting the slurry for the second layer until the papermaking process for the first layer is completed to obtain the wet type nonwoven fabric (filter medium) (in the case of two layers), as described above, the density does not increase, so that the pressure loss also does not increase.

Further, in the case of two layers, as described above, when the above-mentioned short-cut nanofibers are arranged in one layer and no short-cut nanofibers are allowed to be contained in the other layer to provide the density difference between the layers in the plurality of layers constituting the filter medium for a filter, it becomes more possible to obtain the filter having high collection efficiency and low pressure loss and having a long filter lifetime. This is therefore preferred. In that case, as an indication for measuring the density difference between the layers, when the number of fibers on a surface on which more fibers are exposed is taken as DL and the number of fibers on the other surface on which fewer fibers are exposed is taken as DU, in both surfaces of the filter medium for a filter, the DU/DL ratio is preferably 0.8 or less (more preferably from 0.1 to 0.8). When the DU/DL ratio exceeds 0.8 and approaches 1 having no density difference herein, the density difference between the layers decreases, and the filter having high collection efficiency and low pressure loss and having a long filter lifetime is not obtained.

Incidentally, the above-mentioned DL and DU are measured by the following method. That is to say, each of the both surfaces of the filter medium for a filter is photographed at 100× magnification using a scanning electron microscope, and then, a straight line is drawn. The number of fibers (all visually observable fibers) intersecting the line is counted.

Incidentally, in the above-mentioned filter medium for a filter, for example, a sheet-like structure such as a woven fabric or a nonwoven fabric having a coarse structure (air permeability: 100 cc/cm²/s or more), which does not exert an influence on filter performance, may be laminated thereon to improve rigidity. In this case, the above-mentioned sheet-like structure may be provided on either surface of the filter medium for a filter, but is usually preferably provided on the surface of the low-density layer in which no short-cut nanofibers are contained.

Further, also the shape of the filter medium for a filter is not limited to a tabular form, and may be any shape. Furthermore, known functional processing such as ordinary water repellent finish, fire proofing, flame retarding, dying and minus ion generation processing may be added.

<Filter Using Filter Medium for Filter>

Then, the filter of the present invention is a filter obtained using the above-mentioned filter medium for a filter. When there is the density difference between the layers in the plurality of layers constituting the filter medium for a filter, the low-density layer is preferably disposed on a fluid inflow side (dust side). Relatively large dusts are collected by such a low-density layer, and fine dusts are collected by the high-density layer (containing short-cut nanofibers) disposed on a fluid outflow side (clean side). As a result, high collection efficiency, low pressure loss and a long filter lifetime are obtained.

The filter of the present invention has high collection efficiency and low pressure loss, and has a long filter lifetime, so that it can be suitably used as an air filter for an intake air filter for an internal combustion engine, and the like. It may also be used, of course, as an air filter for other uses such as for a room air conditioner, a cooling device, a heater (electric, oil or the like), an automotive air conditioner, an air cleaner, a clean room and a room humidifier, a microfilter and a liquid filter.

The total basis weight of such a filter is usually from 30 to 300 g/m$^2$, preferably from 50 to 250 g/m$^2$, and particularly preferably from about 80 to 200 g/m$^2$.

EXAMPLES

Examples and comparative examples of the present invention will be described in detail below, but the present invention should not be construed as being limited thereby. Incidentally, respective measurement items in examples were measured by the following methods.

Melt Viscosity Curve (1) Melt Viscosity

A polymer after drying treatment was set to an orifice whose temperature had been set to the melting temperature of an extruder at the time of spinning, melted and held for 5 minutes, and then, extruded by applying several levels of load. The shear rate and the melt viscosity at that time were plotted. The plotted points were smoothly connected to prepare a shear rate-melt viscosity curve, and the melt viscosity at the time when the shear rate was 1,000 sec$^{-1}$ was measured.

(2) Measurement of Island Diameter

A fiber cross-sectional photograph was taken at 30,000× magnification under a transmission type electron microscope TEM, and measurement was performed. The measurement was performed utilizing the length measurement capabilities possessed by the TEM. Further, in the absence of the TEM, the photograph taken may be enlarged with a copier and measured with a ruler in view of a reduction scale. However, an average value (n=20) of major axes and minor axes in fiber cross-sections was used as the fiber diameter.

(3) Fiber Length

In a state where an ultrafine short fiber before dissolution and removal of a sea component was laid on a base plate, the fiber length thereof was measured at 20× to 500× magnification under a scanning electro microscope (SEM). The measurement was performed utilizing the length measurement function of the SEM.

(4) Basis Weight

Measurement was performed on the basis of JIS P8124 (Measuring Method of Basis Weight in GSM of Paper).

(5) Thickness

Measurement was performed on the basis of JIS P8118 (Testing Method of Thickness and Density of Paper and Paper Board).

(6) Density

Measurement was performed on the basis of JIS P8118 (Testing Method of Thickness and Density of Paper and Paper Board).

(7) DL and DU

Each of the both surfaces of the filter medium for a filter was photographed at 100× magnification using a scanning electron microscope, and then, a straight line was drawn. The number of fibers (all visually observable fibers) intersecting the line was counted. The number of fibers on a surface on which more fibers were exposed was taken as DL and the number of fibers on the other surface on which fewer fibers were exposed was taken as DU.

(8) Ratio of Maximum Value/Minimum Value of Delamination Strength Between Two Layers When the delamination strength between two layers was measured with n=10 using a Tensilon universal tester manufactured by A & D Co., Ltd., for the remaining 8 values except for the maximum value and the minimum value thereof, the ratio of the maximum value/the minimum value was calculated.

(9) Collection Efficiency

When the flow rate at the time of sample passing was 16.7 cm/sec and the dust concentration was 1 g/m$^3$, using ISO FINE dust, the transmittance of the dust weight before and after the sample was taken as the collection efficiency.

(10) Pressure Loss

The pressure loss was determined at the time of performing the measurement of the above-mentioned collection efficiency (flow rate: 16.7 cm/sec).

(11) Filter Lifetime (DHC)

The above-mentioned collection efficiency test was performed, and the dust retaining amount (weight increase) at the time when an increase in pressure loss reached 2 kPa was taken as the DHC.

Incidentally, for the filter performances in Table 1, the collection efficiency, the pressure loss and the DHC were measured, constituting a filter by disposing a lower layer of a filter medium for a filter on a fluid inflow side and an upper layer of the filter medium for a filter on a fluid outflow side

Example 1

Using polyethylene terephthalate having a melt viscosity of 120 Pa·sec at 285° C. as an island component and modified polyethylene terephthalate having a melt viscosity of 135 Pa·sec at 285° C., which was obtained by copolymerizing 4% by weight of polyethylene glycol having an average molecular weight of 4,000 and 9% by mole of 5-sodium sulfoisophthalic acid, as a sea component, spinning was performed at a weight ratio of sea:island=10:90 using a spinneret having an island number of 400, and taken up at a spinning speed of 1,500 m/min. The difference in alkali reduction rate was 1,000 times. This was drawn to 3.9 times, and cut to 1,000 μm with a guillotine cutter to obtain an ultrafine short fiber precursor. This was subjected to alkali reduction with a 4% NaOH aqueous solution at 75° C. to reduce the weight by 10%. As a result, it was confirmed that ultrafine short fibers having a relatively uniform fiber diameter and fiber length were formed. The resulting fibers were used as short-cut nanofibers (fiber diameter: 750 nm, fiber length: 0.8 mm, L/D=1,067).

On the other hand, as binder fibers, core-sheath conjugate type binder short fibers (fineness: 1.1 dtex, fiber length: 5 mm, no crimp, core/sheath=50/50, core: polyethylene terephthalate having a melting point of 256° C., sheath: copolymerized polyester having a softening point of 110° C., which was mainly composed of terephthalic acid, isophthalic acid, ethylene glycol and diethylene glycol) and, in addition thereto, polyethylene terephthalate short fibers (fineness: 2.2 dtex, fiber length: 5 mm, crimped, triangular in cross section) were mixed at a predetermined weight ratio (short-cut nanofibers/binder fibers/other fibers=5/30/65, basis weight: corresponding to 50 g/m$^2$), followed by stirring. The resulting mixture was put as a first slurry in TAPPI (a square type sheet machine manufactured by Kumagai Riki Kogyo Co., Ltd., hereinafter the same), and about a half of water was withdrawn. A second slurry (binder fibers/other fibers=30/70, corresponding to 50 g/m$^2$) was additionally put therein in a halfway stage of forming wet paper on an undersurface thereof, followed by weak stirring so as not to form an interface, and water was completely withdrawn to obtain wet paper of 100 g/m². Thereafter, rotary dryer drying (120° C.×2 minutes) was performed to obtain a sheet. The physical properties obtained are shown in Table 1.

Example 2

A sheet was prepared by performing the treatment/processing under the same conditions as in Example 1 with the exception that the ratio of the fibers of the upper layer used in Example 1 was changed (nanofiber-mixed layer: short-cut nanofibers/binder fibers/other fibers=20/30/50, 50 g/m²). The physical properties obtained are shown in Table 1.

Example 3

A sheet was prepared by performing the treatment/processing under the same conditions as in Example 1 with the exception that the ratio of the fibers of the upper layer used in Example 1 was changed (nanofiber-mixed layer: short-cut nanofibers/binder fibers/other fibers=1/30/69, 50 g/m²). The physical properties obtained are shown in Table 1.

Example 4

A sheet was obtained under the same conditions as in Example 1 with the exception that in the same raw fiber constitution as in Example 1, the basis weight of the upper layer was changed to 75 g/m², the basis weight of the lower layer to 75 g/m² and the total basis weight to 150 g/m². The physical properties obtained are shown in Table 1.

Comparative Example 1

The slurries used in Example 1 were each separately subjected to papermaking using TAPPI to obtain wet paper layers, and thereafter, they were laminated on each other, followed by the same drying process as in Example 1 after the lamination to obtain a sheet (different type two-layer sheet making). The physical properties obtained are shown in Table 1.

Example 5

A sheet was prepared by performing the treatment/processing under the same conditions as in Example 1 with the exception that the ratio of the fibers of the upper layer used in Example 1 was changed (nanofiber-mixed layer: short-cut nanofibers/binder fibers/other fibers=25/30/45, 50 g/m²). The physical properties obtained are shown in Table 1.

Example 6

A sheet was prepared by performing the treatment/processing under the same conditions as in Example 1 with the exception that polyethylene terephthalate short fibers (fineness: 0.1 dtex (diameter: 3 μm), fiber length: 3 mm, L/D=1,000) were used in place of the short-cut nanofibers of the upper layer used in Example 1. The physical properties obtained are shown in Table 1.

Comparative Example 2

Using the short-cut nanofibers/binder fibers/other fibers=2.5/30/67.5, the same fibers as used in Example 1, a single-layer wet type nonwoven fabric was obtained by papermaking at a basis weight of 100/m² using TAPPI, followed by heat treatment. The physical properties obtained are shown in Table 1.

TABLE 1

| | | | Fiber Diameter × Fiber Length | | Example 1 | Example 2 | Example 3 | Example 4 | Comparative Example 1 | Example 5 | Example 6 | Comparative Example 2 |
|---|---|---|---|---|---|---|---|---|---|---|---|---|
| Raw Fiber Constitution | Upper Layer (dense) | Short-Cut Nanofibers | 750 nm × 0.8 mm (L/D = 1067) | wt % | 5 | 20 | 1 | 5 | 5 | 25 | | 2.5 |
| | | Core-Sheath Conjugate Type Fibers | 1.1 dtex × 5 mm (no crimp) | wt % | 30 | 30 | 30 | 30 | 30 | 30 | 30 | 30 |
| | | Other Fibers | 2.2 dtex × 5 mm (crimped, triangular in cross section) 0.1 dtex × 3 mm (no crimp, circular in cross section) | wt % | 65 | 50 | 69 | 65 | 65 | 45 | 65 | 67.5 |
| | | Design Corresponding Basis Weight | | g/m² | 50 | 50 | 50 | 75 | 50 | 50 | 50 | 100 |
| | Lower Layer (coarse) | Short-Cut Nanofibers | 750 nm × 0.8 mm (L/D = 1067) | wt % | | | | | | | | |
| | | Core-Sheath Conjugate Type Fibers | 1.1 dtex × 5 mm (no crimp) | wt % | 30 | 30 | 30 | 30 | 30 | 30 | 30 | |
| | | Other Fibers | 2.2 dtex × 5 mm (crimped, triangular in cross section) 0.1 dtex × 3 mm (no crimp, circular in cross section) | wt % | 70 | 70 | 70 | 70 | 70 | 70 | 70 | |
| | | Design Corresponding Basis Weight | | g/m² | 50 | 50 | 50 | 75 | 50 | 50 | 50 | |
| | Average | Short-Cut Nanofibers | 750 nm × 0.8 mm (L/D = 1067) | wt % | 2.5 | 10 | 0.5 | 2.5 | 2.5 | 12.5 | 0 | 2.5 |

TABLE 1-continued

| | | Fiber Diameter × Fiber Length | | Example 1 | Example 2 | Example 3 | Example 4 | Comparative Example 1 | Example 5 | Example 6 | Comparative Example 2 |
|---|---|---|---|---|---|---|---|---|---|---|---|
| | Core-Sheath Conjugate Type Fibers | 1.1 dtex × 5 mm (no crimp) | wt % | 30 | 30 | 30 | 30 | 30 | 30 | 30 | 30 |
| | Other Fibers | 2.2 dtex × 5 mm (crimped, triangular in cross section) | wt % | 67.5 | 60 | 69.5 | 67.5 | 67.5 | 57.5 | 67.5 | 67.5 |
| | | 0.1 dtex × 3 mm (no crimp, circular in cross section) | | 0 | 0 | 0 | 0 | 0 | 0 | 2.5 | 0 |
| Structure Confirmation | Properties | Basis Weight | g/m² | 101 | 104 | 101 | 151 | 101 | 99 | 102 | 101 |
| | | Thickness | mm | 0.82 | 0.48 | 0.85 | 1.1 | 0.69 | 0.35 | 0.85 | 0.59 |
| | | Density | g/cm³ | 0.12 | 0.22 | 0.12 | 0.14 | 0.15 | 0.28 | 0.12 | 0.17 |
| | Ratio of Numbers of Fibers on Both Layers (Coarse Layer/Dense Layer) | | — | 0.64 | 0.28 | 0.76 | 0.62 | 0.64 | 0.46 | 0.84 | 0.93 |
| | Delamination Strength Ratio between two adjacent layers (Maximum/Minimum) | | — | 1.73 | 1.86 | 1.65 | 1.77 | 1.20 | 1.80 | 1.30 | 1.86 |
| Filter Performance | | Collection Efficiency | % | 99.83 | 99.99 | 99.67 | 99.99 | 99.99 | 99.99 | 95.87 | 99.74 |
| | | Pressure Loss | Pa | 543 | 765 | 476 | 678 | 876 | 987 | 476 | 768 |
| | | DHC | g/m² | 456 | 376 | 676 | 576 | 245 | 354 | 564 | 221 |
| | Remarks | | — | *1 | *2 | *3 | *4 | *5 | *6 | *7 | *8 |

*1 The collection efficiency and the pressure loss are well balanced. (Standard)
*2 The collection efficiency tended to be increased, because the nanofiber ratio was increased.
*3 The pressure loss was decreased, resulting in an increase in DHC, because the nanofiber ratio was decreased.
*4 The collection efficiency was increased, because the basis weight was increased.
*5 The pressure loss is high, and the DHC is low, because the density is increased.
*6 The pressure loss is high, because the nanofiber ratio is large.
*7 The collection efficiency was decreased, because of no presence of nanofibers.
*8 The thickness was decreased (the density was increased), resulting in high pressure loss and short lifetime, because of the single layer.

INDUSTRIAL APPLICABILITY

According to the present invention, there are provided a filter medium for a filter, which makes it possible to obtain a filter that is high in collection efficiency, low in pressure loss and long in filter lifetime and has high collection efficiency, low pressure loss and a long filter lifetime, and a filter using the filter medium for a filter. The filter is also useful as a filter for an indoor air conditioner, a cooler, a heater (electric or oil-fired), an automotive air conditioner, an air cleaner, a clean room, an indoor humidifier or the like, a microfilter and a liquid filter, as well as an air filter for an internal combustion engine such as an intake air filter for an internal combustion engine. Thus, the industrial value thereof is extremely large.

The invention claimed is:

1. An air filter for an internal combustion engine obtained using a filter medium for a filter, which is used as a constituent member of the filter and which comprises a wet type nonwoven fabric, wherein the filter medium for the filter has a multilayer structure of two or more layers and there is no interface between two adjacent layers of the multilayer structure, wherein short-cut nanofibers comprising a fiber-forming thermoplastic polymer, having a single fiber diameter (D) of 100 to 1,000 nm and obtained by performing cutting so that the ratio (L/D) of the length (L) to the single fiber diameter (D) is within the range of 100 to 2,500, are contained only in one layer of the multilayer structure of the filter medium for the filter, thereby providing a layer structure in which an amount of the short-cut nanofibers gradually decreases in a thickness direction, and wherein a low-density layer is disposed on a fluid inflow side, and wherein when the delamination strength between the two adjacent layers of the multilayer structure is measured 10 times, for the remaining 8 values except for the maximum value and the minimum value thereof, the ratio of the maximum value/the minimum value is 1.5 or more, and wherein core-sheath conjugate type binder fibers are contained in the filter medium for a filter in an amount of 20 to 40% by weight, and wherein the thickness thereof is 0.5 to 4.0 mm.

2. The air filter according to claim 1, wherein the short-cut nanofibers are ones obtained by dissolving and removing a sea component from a conjugate fiber comprising an island component composed of a fiber-forming thermoplastic polymer and having an island diameter (D) of 100 to 1,000 nm and a sea component composed of a polymer more easily soluble in an alkaline aqueous solution than the fiber-forming thermoplastic polymer.

3. The air filter according to claim 2, wherein the sea component in the conjugate fiber is polyethylene terephthalate copolymerized with 6 to 12% by mole of 5-sodium sulfoisophthalic acid and 3 to 10% by weight of polyethylene glycol having a molecular weight of 4,000 to 12,000.

4. The air filter according to claim 2, wherein the island component in the conjugate fiber is a polyester.

5. The air filter according to claim 2, wherein the number of islands in the conjugate fiber is 100 or more.

6. The air filter according to claim 1, wherein in both surfaces of the filter medium for the filter, when the number of fibers on a surface on which more fibers are exposed is taken as DL and the number of fibers on the other surface on which fewer fibers are exposed is taken as DU, the DU/DL ratio is 0.8 or less.

7. The air filter according to claim 1, wherein the basis weight thereof is within the range of 30 to 300 g/m².

8. The air filter according to claim 1, wherein a high-density layer is disposed on a fluid outflow side.

* * * * *